2,996,709
Patented Aug. 15, 1961

2,996,709
FLEXIBLE ELECTROMAGNETIC RADIATION-ABSORPTIVE ARTICLE
Burt Carlton Pratt, Brandywine Hundred, Del., assignor to E. I. du Pont de Nemours and Company, Wilmington, Del., a corporation of Delaware
No Drawing. Filed Apr. 27, 1945, Ser. No. 590,747
8 Claims. (Cl. 343—18)

This invention relates to metal-pigmented films, and more particularly to a flexible article of improved electromagnetic properties comprising such films.

This invention has as an object the provision of a flexible article which comprises a pliable metal-backed film which has the property of modifying or absorbing electromagnetic radiations of high frequency. Further objects will appear hereinafter.

These objects are accomplished by the following invention of a flexible article of manufacture which comprises a self-supporting, pliable, pigmented film having as the binder a film-forming polymer of a monoolefinic aliphatic hydrocarbon, such polymer having in its unpigmented and unplasticized condition a dielectric constant of less than about 3.5 at 1,000 kilocycles, and, as the pigment, thin metallic flakes, the flakes being present in proportion of at least 25% by weight of the film and being at least partially oriented with respect to the plane of the film. Such films of predetermined thickness attached to electromagnetic radiation-reflective metal surfaces absorb or modify radiations having a frequency within the range of $10^6$ to $10^{11}$ cycles per second.

In one method of carrying out the invention a tough, film-forming polymer of a lower monoolefinic aliphatic hydrocarbon having the above-mentioned low dielectric constant is dissolved in a suitable solvent, thin metallic flakes in an amount at least equal to 25% and preferably between 65 and 85% of the total weight of solids uniformly incorporated into this solution, and a film formed from the resulting composition under conditions in which the metallic flakes are oriented with respect to the plane of the film.

In another method of carrying out the invention a tough film-forming polymer of a lower monoolefinic aliphatic hydrocarbon is compounded with customary peptizing, accelerating, loading and curing agents, thin metallic flakes in an amount at least equal to 25% of the weight of solids then incorporated into the compounded polymer in a rubber mill in the minimum time necessary to secure their uniform dispersion, and a film formed from the resulting mix by calendering.

This invention is illustrated in greater detail by the following examples in which proportions of ingredients are expressed as parts by weight unless otherwise specified.

*Example I*

A mixture of 45 parts of very fine aluminum flakes (of average thickness of about 0.3 micron, measured as described in Edwards, "Aluminum Paint and Powder"), 33 parts of a 15% xylene solution of polyisobutylene having a dielectric constant of 2.3 at 1,000 kilocycles, and 40 parts of xylene is stirred until uniform, then degassed by subjecting it alternately to reduced pressure (100 mm. of mercury) and to atmospheric pressure until a thin film of the dispersion is observed to be free from bubbles. The composition is spread by means of a knife on a glass plate, previously coated with a very thin (about 1 mil) film of glycerol-plasticized polyvinyl alcohol, with the knife set at a clearance of 25 mils. The composition is allowed to dry slowly (covered) for one day and to air-dry for two days more at room temperature. The film is stripped from the plate, the polyvinyl alcohol film softened by contact with a wet cloth for five minutes and then stripped from the pigmented film. After oven-drying, the detached film, which contains 90% aluminum, is 3–4 mils thick, is quite pliable, and is very bright and smooth. The brightness indicates a high degree of orientation of the metallic flakes in the plane of the film. When such a film is laminated and applied to a metallic surface, the combined metal-pigmented film absorbs incident electromagnetic radiations having a frequency within the range of $10^6$ to $10^{11}$ cycles per second, optimum absorption of radiations of any specific frequency within this range being obtained by the use of films of predetermined thickness.

*Example II*

Ten (10) parts of solid ethylene polymer, of dielectric constant 2.3 at 1,000 kilocycles, is dissolved in 160 parts of xylene by stirring and heating under reflux. To the resulting solution is added 30 parts of fine aluminum flakes and the viscous dispersion stirred at about 130° C. until uniform. The hot dispersion is spread by means of knife onto a glass plate, both the knife and glass plate previously heated to about 120° C., with the knife set at a clearance of 25 mils. The coating is allowed to dry at 120° C. for four hours, and the film removed from the glass plate after immersion in water at 65° C. for eight hours. The resulting film is 2.0 to 2.5 mils thick and has a bright appearance, indicating a high degree of orientation of the aluminum flakes, which are present in an amount of 75%. When such films are laminated to a predetermined thickness and joined to a metal surface, they have the property of absorbing electromagnetic radiations having a given frequency within the range of $10^6$ to $10^{11}$ cycles per second.

*Example III*

A mixture of 50 parts of the interpolymer of a large amount of isobutylene and a small amount of butadienes (known commercially as "butyl rubber" and having a dielectric constant of about 2.3 at 1000 kilocycles), 2.5 parts of zinc oxide, 0.5 part of tetramethylthiuram disulfide and 1.5 parts of sulfur is milled in a cold rubber mill until uniform, 18 minutes being required. Twenty-five (25) parts of the resulting mix is dissolved by stirring at room temperature in 100 parts of xylene. To 40 parts of this solution are added 32 parts of thin aluminum flake pigment and 60 parts of xylene. The mixture is stirred until uniform, strained through a cloth filter and then degassed by subjecting it alternately to reduced pressure and atmospheric pressure as described in Example I. The composition is spread by means of a knife on a glass plate, previously coated with a very thin (about 1 mil) film of glycerol-plasticized polyvinyl alcohol, with the knife set at a clearance of 19 mils. The composition is allowed to dry overnight at room temperature, the film then being stripped from the glass plate. The polyvinyl alcohol film is wet with water and stripped from the metal-pigmented film. After drying for about 16 hours at 70° C. and curing at 145–150° C. for 20 minutes, the pliable self-supporting film of 3.0 mils thickness and containing 80% of aluminum flake pigment is found to have a tensile strength of 415 lbs./sq. in. and 25% elongation. Such films, when combined to a predetermined thickness and applied to a metallic surface, absorb electromagnetic radiations having a given frequency within the range of $10^6$ to $10^{11}$ cycles per second.

While this invention has been illustrated with particular reference to ethylene polymer, polyisobutylene, and an isobutylene/butadiene interpolymer as the film-forming polymers of monoolefinic aliphatic hydrocarbons, other specific polymers of such hydrocarbons (including their copolymers with lesser amounts of vinyl or vinylidene compounds copolymerizable therewith, e.g., vinyl acetate, methyl methacrylate, methyl vinyl ketone, and vinyl chloride), which polymers have in their unpigmented and unplasticized state a dielectric constant of less than about 3.5 at 1,000 kilocycles, may be employed in the practice of the invention. The ethylene polymers used in the practice of this invention are solid polymers at ordinary temperature which are capable of forming self-supporting films, and can be obtained by polymerizing ethylene alone or admixed with lesser amounts of vinyl or vinylidene compounds at elevated temperature and at high pressure in accordance with the methods disclosed in U.S. Patents 2,153,553 and 2,200,429. The polymers obtained from ethylene alone correspond in composition substantially to $(CH_2)_x$ and show a crystalline structure when subjected to X-ray diffraction analysis.

Any metal in the form of flakes of pigment size may be used in making the films of this invention. Aluminum flakes are preferred, but other metals, such as steel, magnesium, nickel, the nickel-iron alloy known as "Permalloy," copper, silver, zinc, lead, and gold in the form of flakes, can also be used. The proportion of flake metal in the film should be high, i.e., at least about 25%, but not so high that the resulting film has insufficient strength to be self-supporting, the latter in turn depending on the physical properties of the particular monoolefinic aliphatic hydrocarbon polymer used and on the amount and type of any plasticizer employed, and being determinable by simple test. The flakes should be at least partially oriented in a parallel manner with respect to the plane of the film; i.e., the flake surfaces of major area parallel to the plane of the film. Orientation is accomplished by various methods such as by knifing the viscous composition onto a supporting surface, by mechanical working of the films, e.g., by cold rolling, stretching, milling, pressing, etc., when the binder is capable of withstanding such treatment; or, if the metallic flake is a ferromagnetic one, by rotating the wet composition on a support in a magnetic field as described in United States Patent 2,418,479.

The thickness of the films of this invention can be varied depending on the particular physical and electrical properties desired in the final film and the particular application in which it is to be employed. The film can be a single layer of 1 mil thickness or less; it can be one built up to any desired thickness by the application of multiple coats to the supporting surface with drying between each coat; or it can be prepared by laminating thin films by heat or adhesives. The thickness of the film is an important factor when the film is to be used for absorbing or modifying electromagnetic radiations having a frequency within the range of $10^6$ to $10^{11}$ cycles per second, and should be adjusted with due regard to other variables including the nature and amount of metallic flake, the nature of the vehicle or binder, the method of forming the film, and the specific frequency of the radiations which the film is designed to absorb; in this field the film as used (single or composite) should in general be at least 10 mils thick, and may be as thick as 150 mils or more.

The present invention comprehends a flexible article comprising a pliable metal-pigmented film of the hereindescribed type deposited on metallic foil, or other flexible base, in single or multiple coats (for example, by knifecoating, calendering, or other process) to produce coated flexible articles in which the metallic flake is at least partly oriented in the plane of the coating. If desired, the coated article may be subjected to a rolling treatment after the composition has been applied or at various intervals during the application of the several coats to improve or modify the orientation of the flakes.

Various auxiliary components, such as plasticizers hardening agents, extenders and reinforcing agents, may be used with the vehicle, as needed or desired to improve the physical properties of the film provided their nature and amount are such as not to modify unduly the electrical characteristics of the final film. The plasticizers which can be used depend on the particular monoolefinic hydrocarbon polymer used as the binder. The preferred plasticizers are those which are oxygen-free, e.g., hydrocarbons such as the unsaturated hydrocarbon plasticizer having the empirical formula $(C_2H_4)_n$ and having a viscosity at 100° C. of at least 21 centipoises and halogenated hydrocarbons such as chlorinated diphenyl. With certain vehicles such as, for example polyisobutylene, it is sometimes desirable to include a hardening agent to obtain the desired physical properties in the film. Suitable hardening agents include ester gum and non-thermosetting phenol-formaldehyde resins. Clay, alone or in combination with carbon black, is a suitable extender and reinforcing agent, being particularly useful in diene-modified polyisobutylene films.

When metallic flakes are used which are likely to rust under the conditions to which a film is to be subjected, rust inhibitors can be included in the composition. However, the use of rust inhibitors is not necessary when ethylene polymer, or a mixture of ethylene polymer and polyisobutylene, is used as the vehicle; steel-pigmented film containing these particular vehicles are highly resistant to corrosion.

The electromagnetic radiation-absorptive articles of this invention are useful in those applications where it is desired to modify or absorb electromagnetic radiations having a frequency of $10^6$ to $10^{11}$ cycles per second.

As many apparently widely different embodiments of this invention may be made without departing from the spirit and scope thereof, it is to be understood that I do not limit myself to the specific embodiments thereof except as defined in the appended claims.

I claim:

1. A flexible article of manufacture capable of absorbing electromagnetic radiations having a frequency in the range of from $10^6$ to $10^{11}$ cycles per second, said article comprising a metal foil coated with a film of polymer having a dielectric constant less than 3.5 at 1000 kilocycles and consisting predominantly of a polymerized monoolefinic aliphatic hydrocarbon containing from 2 to 4 carbon atoms, said film having a thickness of at least 10 mils and containing thin metal flakes which are at least partially oriented with respect to the plane of the film, said flakes being present in an amount of at least 25% of the weight of said film but below that at which a film of said polymer and said flake has insufficient strength to be self-supporting.

2. The flexible article defined in claim 1 in which said metal flakes are present in amount of from 65% to 85%.

3. The flexible article defined in claim 1 in which said polymer is polyisobutylene.

4. The flexible article defined in claim 1 in which said polymer is ethylene polymer.

5. The flexible article defined in claim 1 in which said polymer is the copolymerization product of isobutylene and a minor amount of butadienes.

6. The flexible article defined in claim 1 in which said polymer is polyisobutylene and in which said pigment is composed of thin aluminum flakes.

7. The flexible article defined in claim 1 in which said polymer is ethylene polymer and in which said pigment is composed of thin aluminum flakes.

8. The flexible article defined in claim 1 in which said polymer is the copolymerization product of isobutylene and a minor amount of butadiene and in which said pigment is composed of thin aluminum flakes.

References Cited in the file of this patent

UNITED STATES PATENTS

| | | |
|---|---|---|
| 1,662,865 | Powell | Mar. 20, 1928 |
| 2,131,342 | Baldeschwieler | Sept. 27, 1938 |
| 2,162,204 | Weith | June 13, 1939 |

(Other references on following page)

UNITED STATES PATENTS

| | | |
|---|---|---|
| 2,199,526 | McCowen | May 7, 1940 |
| 2,245,745 | Ball | June 17, 1941 |
| 2,287,053 | Murphy | June 23, 1942 |
| 2,418,479 | Pratt et al. | Apr. 8, 1947 |

OTHER REFERENCES

Simonds et al.: Handbook of Plastics, pp. 56, 396, pub. in 1943, by D. Van Nostrand, New York, N.Y.